(12) United States Patent
Swingley

(10) Patent No.: US 6,959,880 B2
(45) Date of Patent: Nov. 1, 2005

(54) PIPE FITTING WITH LENGTH ADJUSTMENT

(75) Inventor: Douglas Swingley, Saugus, CA (US)

(73) Assignee: Spears Manufacturing Co., Sylmar, CA (US)

( * ) Notice: Subject to any disclaimer, the term of this patent is extended or adjusted under 35 U.S.C. 154(b) by 146 days.

(21) Appl. No.: 10/364,076

(22) Filed: Feb. 10, 2003

(65) Prior Publication Data

US 2004/0164188 A1  Aug. 26, 2004

(51) Int. Cl.[7] .......................................... A01G 25/06
(52) U.S. Cl. .................. 239/200; 239/201; 239/280.5; 285/298; 138/114
(58) Field of Search ............................... 239/200–205, 239/280, 273, 280.5; 285/298; 137/362, 137/363; 138/114

(56) References Cited

U.S. PATENT DOCUMENTS

| | | | |
|---|---|---|---|
| 1,833,040 A | * | 11/1931 | Rader .......................... 285/302 |
| 3,825,186 A | * | 7/1974 | Heenan et al. .............. 239/280 |
| 4,274,592 A | * | 6/1981 | Westhusin ................... 239/200 |
| 5,133,501 A | * | 7/1992 | Marshall ..................... 239/201 |
| 6,193,168 B1 | | 2/2001 | Derrick |

* cited by examiner

Primary Examiner—Dinh Q. Nguyen
(74) Attorney, Agent, or Firm—Denton L. Anderson; Sheldon & Mak

(57) ABSTRACT

A length adjustable conduit has a hollow tubular body and a hollow tubular shaft coaxially disposed in fluid tight communication with the hollow tubular body. The conduit further includes an adjustment mechanism for adjusting the combined length of the tubular body and tubular shaft.

1 Claim, 4 Drawing Sheets

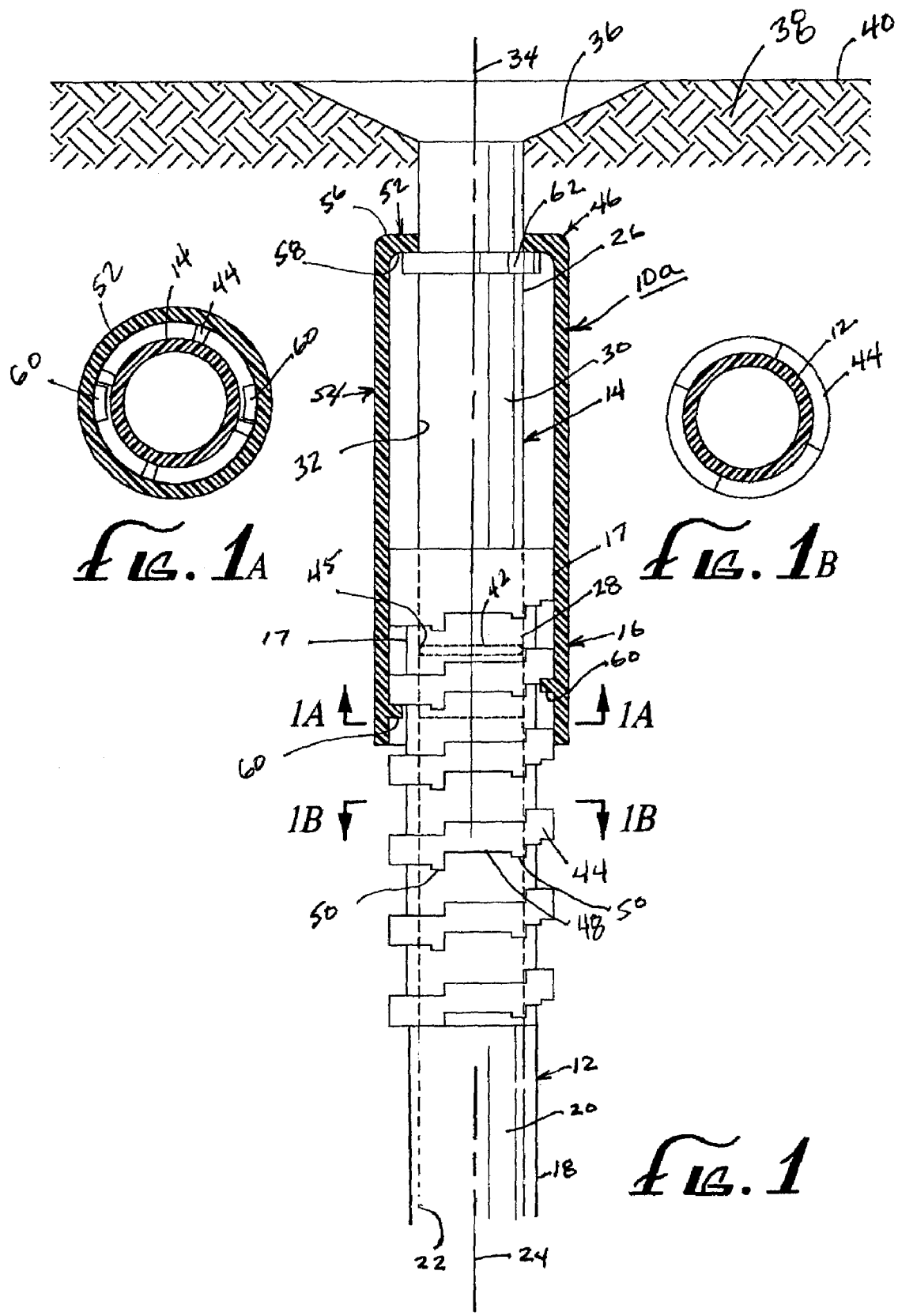

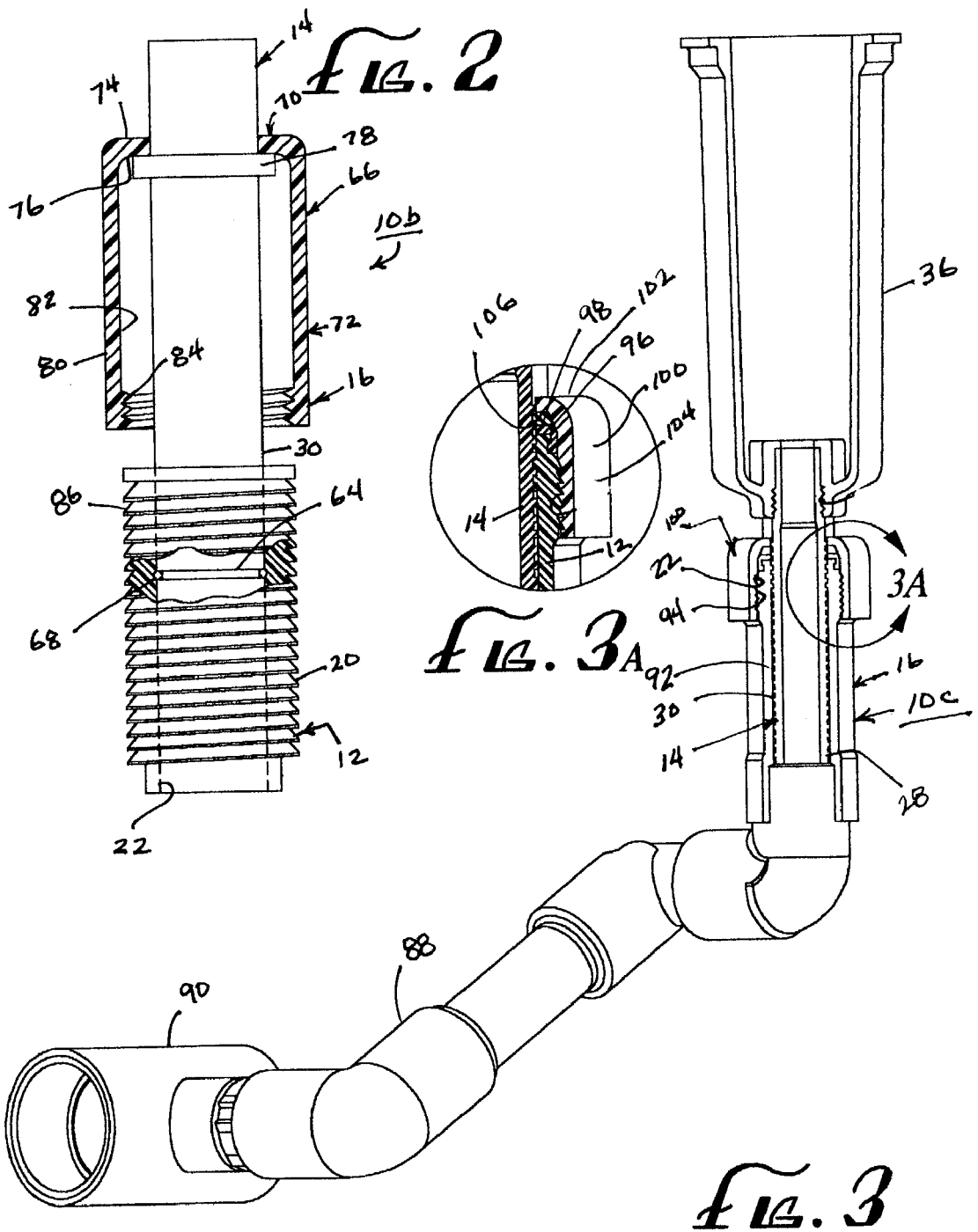

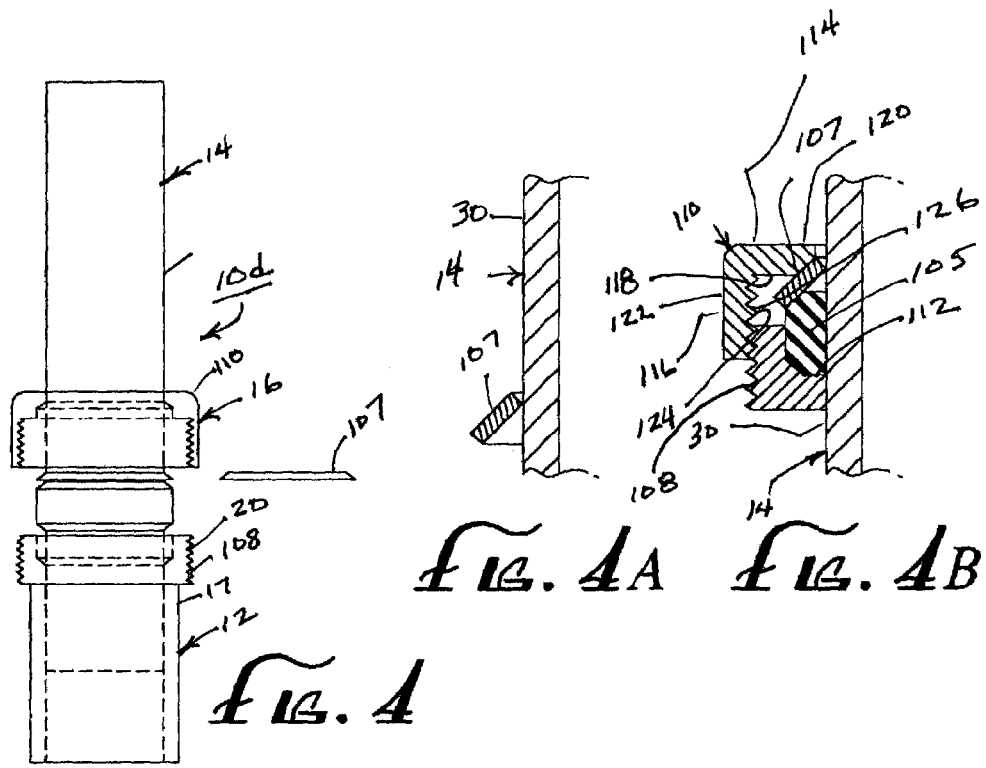
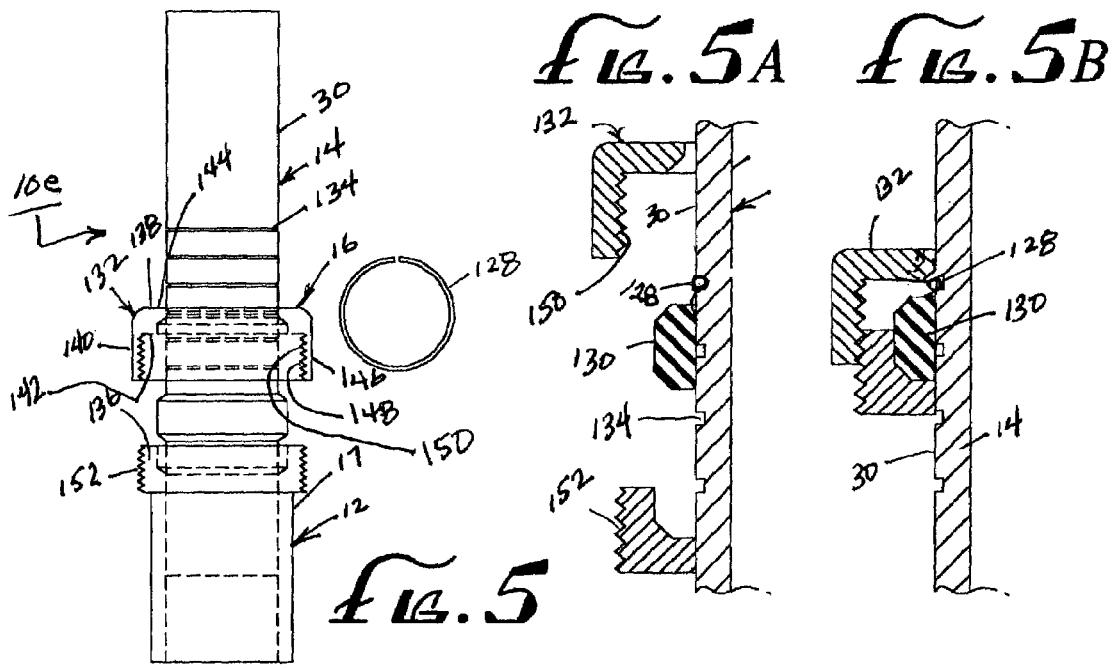

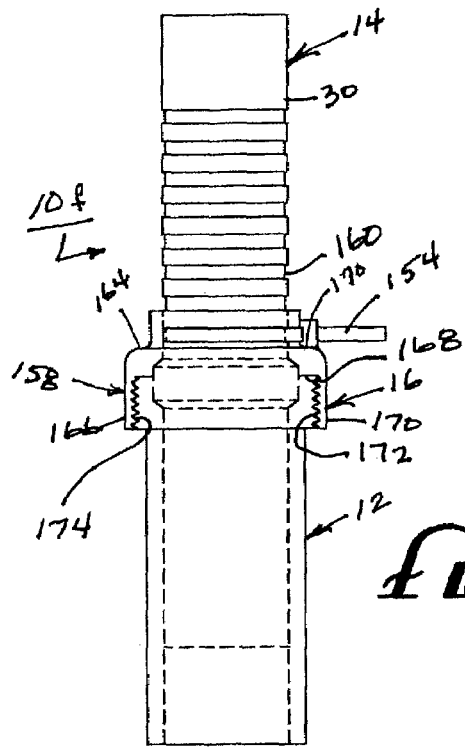
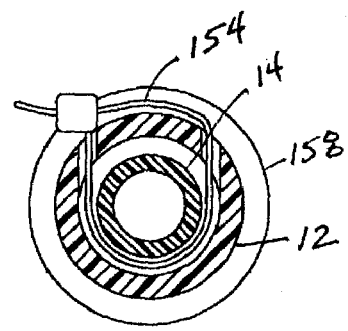
FIG. 6  FIG. 6A
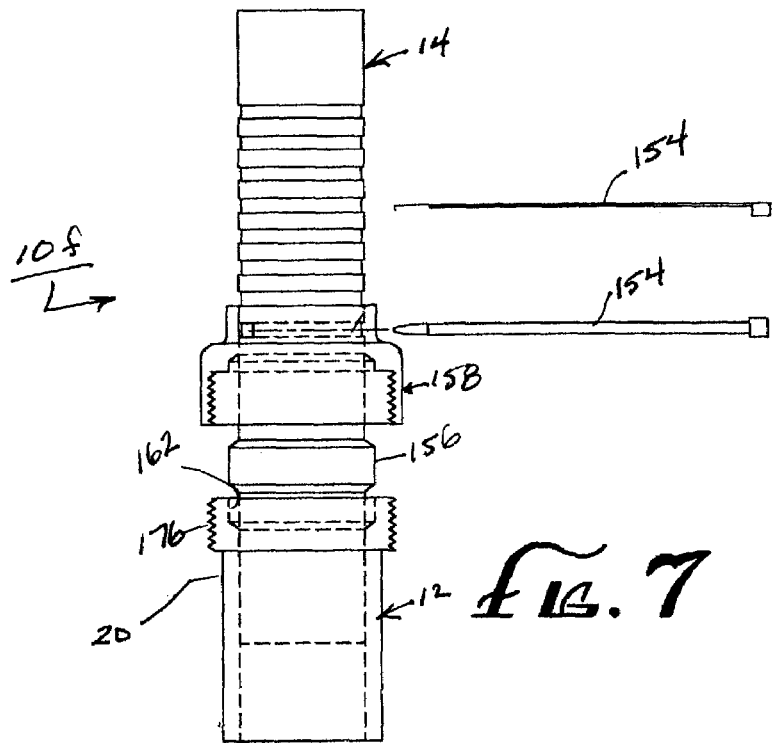
FIG. 7

PIPE FITTING WITH LENGTH ADJUSTMENT

FIELD OF THE INVENTION

The present invention is directed to pipe fittings.

BACKGROUND OF THE INVENTION

There is a need for a pipe fitting which can be readily adjusted in length. Such a length-adjustable pipe fitting would be useful, for example, in adjusting the height of irrigation sprinkler heads above a buried main supply line.

In the present state of the irrigation construction arts, swing joints are commonly used to provide a flexible means of connecting pipe fittings bearing irrigation sprinkler heads to a main supply line. The use of swing joints allows the height of the sprinkler heads to be adjusted in the field to meet particular grade elevation requirements—but only during the construction of the irrigation system.

After construction of an irrigation system, however—when top soil grading is finished and soil compacted around the pipe fittings bearing the sprinkler heads—any additional adjustments of the height of any one of the sprinkler heads necessarily requires that the entirety of the pipe fitting bearing the sprinkler head and much of the associated swing joint must be excavated. Excavating the pipe fitting and swing joint is time-consuming and expensive and frequently results in damage to the sprinkler head, the pipe fitting bearing the sprinkler head, the swing joint and/or the main supply line.

Accordingly, there is a need for a pipe fitting which can be readily adjusted in length.

SUMMARY

The invention satisfies this need. The invention is a length adjustable conduit comprising (a) a hollow tubular body having an upper end, a lower end, an outer surface, an inner surface and a longitudinal axis, (b) a hollow tubular shaft having an upper end, a lower end, an outer surface, an inner surface and a longitudinal axis, the shaft being attached to the body such that the longitudinal axis of the body and the longitudinal axis of the shaft are disposed along substantially the same line, the lower end of the shaft being disposed in fluid tight communication with the upper end of the body, the body and the shaft having a combined length, and (c) an adjustment mechanism for adjusting the combined length of the shaft and the body while maintaining the shaft and the body in fluid tight connection.

The invention can be used to provide a sprinkler head which is adjustable with respect to elevations, but the invention has many other uses as well. The invention can be used wherever a length adjustable conduit is advantageous.

DRAWINGS

These and other features, aspects and advantages of the present invention will become better understood with reference to the following description, appended claims and accompanying drawings where:

FIG. 1 is a side view in partial cross-section of a first length adjustable conduit having features of the invention;

FIG. 1A is a cross-sectional view of the length adjustable conduit illustrated in FIG. 1, taken along line 1A—1A;

FIG. 1B is a cross-sectional view of the length adjustable conduit illustrated in FIG. 1, taken along line 1B—1B;

FIG. 2 is a side view in partial cross-section of a second length adjustable conduit having features of the invention;

FIG. 3 is an isometric view of the length adjustable conduit illustrated in FIG. 2, shown attached to a swing joint;

FIG. 3A is an isometric detail view in partial cross-section of the embodiment illustrated in FIG. 3;

FIG. 4 is a side view of a third length adjustable conduit having features of the invention;

FIG. 4A is a cross-sectional detail view of one aspect of the length adjustable conduit illustrated in FIG. 4;

FIG. 4B is a cross-sectional detail view of a second aspect of the length adjustable conduit illustrated in FIG. 4;

FIG. 5 is a side view of a fourth length adjustable conduit having features of the invention;

FIG. 5A is a cross-sectional detail view of one aspect of the length adjustable conduit illustrated in FIG. 5;

FIG. 5B is a cross-sectional detail view of a second aspect of the length adjustable conduit illustrated in FIG. 5;

FIG. 6 is a side view of a fifth length adjustable conduit having features of the invention;

FIG. 6A is a cross-sectional view of the length adjustable conduit illustrated in FIG. 6, taken along lines 6A–6A; and FIG. 7 is a side view of a sixth length adjustable conduit having features of the invention.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a length adjustable conduit 10 comprising a hollow tubular body 12, a hollow tubular shaft 14 connected coaxially with the body 12 and an adjustment mechanism 16 for adjusting the combined length of the shaft 14 in the body 12 while maintaining the shaft 14 and the body 12 in fluid tight connection.

The body 12 has an upper end 17, a lower end 18, an outer surface 20, an inner surface 22 and a longitudinal axis 24. Typically, the body 12 is made from a plastic material, but this is not necessary. Other materials, such as metals, can also be used.

The shaft 14 also has an upper end 26, a lower end 28, an outer surface 30, an inner surface 32 and a longitudinal axis 34. The shaft 14 is attached to the body 12 such that the longitudinal axis 24 of the body 12 and the longitudinal axis 34 of the shaft 14 are disposed along substantially the same line. The upper end 26 of the shaft 14 is disposed in fluid tight communication with the lower end 18 of the body 12 so that the body 12 and the shaft 14 have a combined length.

FIGS. 1, 1A and 1B illustrate a first embodiment of the invention 10a. In FIGS. 1, 1A and 1B, a sprinkler head 36 is shown disposed within the ground 38 at grade level 40. The sprinkler head 36 is disposed in fluid tight communication with the length adjustable conduit 10a comprising a hollow tubular body 12, a hollow tubular shaft 14 and an adjustment mechanism 16 for adjusting the elevation of the shaft 14 relative to the body 12.

The adjustment mechanism 16 in the embodiment illustrated in FIGS. 1, 1A and 1B is provided by an O-ring 42, a locking helix 44 and a hold down nut 46. The O-ring 42 is disposed within an O-ring groove 45 at the lower end 28 of the shaft 14. The O-ring 42 is disposed in abutment with the inner surface 22 of the body 12 so as to seal the inner surface 22 of the body 12 to the outer surface 30 of the shaft 14.

The locking helix 44 is disposed around the outer surface 20 of the body 12. The locking helix 44 comprises a plurality of horizontal locking areas 48, each disposed between a pair of spaced apart and downwardly projecting locking stops 50.

The hold down nut 46 comprises a top wall 52 and vertical side walls 54. The top wall 52 has an outer side 56 and an inner side 58. The side walls 54 have a pair of spaced apart horizontal internal ridges 60, each sized and dimensioned to be retained within one of the locking areas 48 in the locking helix 44. The hold down nut 46 impinges upon a hold down nut shoulder 62 which is disposed on the outer surface 30 of the shaft 14 above the O-ring groove 45.

The overall height of the length adjustable conduit 10a is adjusted by pushing down on the hold down nut 46 to clear the presently used locking stop 50 and then rotating the hold down nut 46 to the next locking area 48. When pressure on the hold down nut 46 is released, the hold down nut 46 is biased upwardly where the horizontal internal ridges 60 within the hold down nut 46 become retained in one of the locking areas 48 in the locking helix 44.

FIG. 2 illustrates a second embodiment of the invention 10b. FIG. 2 illustrates a length adjustable conduit 10b wherein the adjustment mechanism 16 comprises an O-ring 64 and a hold down nut 66. In the embodiment illustrated in FIG. 2, the O-ring 64 is disposed within an O-ring groove 68 at the lower end 28 of the shaft 14. The O-ring 64 is disposed in abutment with the inner surface 22 of the body 12 so as to seal the inner surface 22 of the body 12 to the outer surface 30 of the shaft 14.

The hold down nut 66 has a top wall 70 and vertical side walls 72. The top wall 70 has an outer side 74 and an inner side 76. The inner side 74 of the top wall 70 impinges upon a hold down nut shoulder 78 disposed on the upper end 16 of the body 12. The side walls 72 of the hold down nut 66 have an outer side 80 and an inner side 82. The inner side 82 of the side walls 72 has internal threads 84 which match corresponding external threads 86 disposed on the outer surface 20 of the body 12 above the O-ring groove 68. The hold down nut 66 is threaded onto the outer surface 20 of the body 12.

The length adjustable conduit 10b is easily adjusted in length by rotating the hold down nut 66 with respect to the body 12.

FIGS. 3 and 3A illustrates a third embodiment of the invention. FIGS. 3 and 3A illustrate a sprinkler head 36 disposed atop a length adjustable conduit 10c. The length adjustable conduit 10c is shown attached to a swing joint 88. The swing joint 88 is shown attached to a water main 90.

In the embodiment illustrated in FIG. 3, the adjustment mechanism 16 is provided by external threads 92 disposed about the outer surface 30 of the shaft 14, internal threads 94 disposed about the inner surface 22 of the body 12, an outwardly projecting lip 96 disposed about the upper end 17 of the body 12, a resilient sealing gasket 98 tightly disposed about the outer surface 30 of the shaft 14 and a retaining nut 100 threadedly disposed to the upper end 17 of the body 12.

The external threads 92 disposed about the outer surface 30 of the shaft 14 are sized and dimensioned to mate with the internal threads 94 disposed about the inner surface 22 of the body 12 so that the lower end 28 of the shaft 14 is threadedly attached to the body 12.

The resilient sealing gasket 98 disposed about the outer surface 30 of the shaft 14 is disposed in contact with the outwardly projecting lip 96.

The retaining nut 100 has a top wall 102 with an outer side 104 and an inner side 106. The inner side 106 of the top wall 102 is in contact with the resilient sealing gasket 98 to seal the resilient sealing gasket 98 to the outer surface 30 of the shaft 14.

Like the embodiment illustrated in FIG. 2, the embodiment illustrated in FIGS. 3 and 3A is easily adjustable with respect to its overall length by rotating the retaining nut 100 with respect to the body 12.

FIGS. 4, 4A and 4B illustrate a fourth embodiment of the length adjustable conduit 10d of the invention. In FIGS. 4, 4A and 4B, the adjustment mechanism 16 is provided by a resilient washer 105, a curved washer 107, external threads 108 disposed about the upper end 17 of the body 12 and a hold down nut 110.

The resilient washer 105 is disposed within a washer well 112 at the upper end 17 of the body 12 and is disposed around the outer surface 30 of the shaft 14.

The curved washer 107 is disposed around the shaft 14 and above the resilient washer 105.

The hold down nut 110 has a top wall 114 and vertical side walls 116. The top wall 114 has an inner side 118 and an outer side 120. The side walls 116 have an outer side 122 and an inner side 124. The inner side 124 of the side walls 116 have internal threads 126 which match the external threads 108 disposed about the upper end 17 of the body 12. The hold down nut 110 is threaded out to the outer surface 20 of the body 12. The inner side 118 of the top wall 114 is disposed such that it pressures downwardly against the curved washer 107 and the resilient washer 105 to expand the resilient washer 105 to seal the outer surface 30 of the shaft 14 to the inner surface 22 of the body 12.

The length adjustable conduit 10d is easily adjusted by backing off the hold down nut 110 until the curved washer 107 slides free on the shaft 14. Then the shaft 14 can be moved with respect to the body 12, when the hold down nut 110 is again tightened, the curved washer 107 is against the shaft 14 and the length adjustable conduit 10d is again rigid.

FIGS. 5, 5A and 5B illustrate a fifth embodiment of the length adjustable conduit 10e of the invention. In the embodiment illustrated in FIGS. 5, 5A and 5B, the adjustment mechanism 16 is provided by a lock ring 128, a resilient washer 130 and a hold down nut 132.

The lock ring 128 is disposed within one of a plurality of spaced apart detent grooves 134 disposed within the outer surface 30 of the shaft 14.

The resilient washer 130 is disposed within a washer well 136 at the upper end 17 of the body 12 and is disposed around the outer surface 30 of the shaft 14.

The hold down nut 132 has a top wall 138 and vertical side walls 140. The top wall 138 has an inner side 142 and an outer side 144. The inner side 142 of the top wall 138 is disposed above and in contact with the lock ring 128.

The side walls 140 have an outer side 146 and an inner side 148. The inner side 148 of the side walls 140 comprise internal threads 150 which match external threads 152 on the outer surface 20 of the body 12.

The hold down nut 132 is threaded onto the outer surface 20 of the body 12. As such, the inner side 142 of the top wall 138 is disposed such that it pressures downwardly against the resilient washer 130 to expand the resilient washer 130 and thereby to seal the outer surface 30 of the shaft 14 to the inner surface 22 of the body 12.

The length adjustable conduit 10e is easily adjusted by backing off on the hold down nut 132 until the lock ring 128 slides loosely on the shaft 14 and the resilient washer 130 is free. The shaft 14 can then be adjusted with respect to the body 12. Once adjustment is complete, the hold down nut 132 is again tightened whereby the lock ring 128 is tightly retained into a new locking groove 130.

FIGS. 6, 6A and 7 illustrate a sixth embodiment 10f of the length adjustable conduit of the invention. In the embodiments illustrated in FIGS. 6, 6A and 7, the adjustment mechanism 16 is provided by a spline lock 154, a resilient washer 156 and a hold down nut 158.

The spline lock 154 is disposed within one of a plurality of spaced apart detent grooves 160 which are disposed within the outer surface 30 of the shaft 14.

The resilient washer 156 is disposed within a washer well 162 at the upper end 17 of the body 12 and is disposed around the outer surface 30 of the shaft 14.

The hold down nut 158 has a top wall 164 and vertical side walls 166. The top wall 164 has an inner side 168 and an outer side 170. The inner side 168 of the top wall 164 is disposed above and in contact with the spline lock 154.

The side walls 166 have an outer side 170 and an inner side 172. The inner side 172 of the side walls 166 have internal threads 174 which match external threads 176 on the outer surface 20 of the body 12. The hold down nut 158 is threaded onto the outer surface 17 of the body 12. The inner side 168 of the top wall 164 is disposed such that it pressures downwardly against the resilient washer 156 to expand the resilient washer 156 to seal the outer surface 30 of the shaft 14 to the inner surface 22 of the body 12.

The length adjustable conduit 10f can be easily adjusted by removing the spline lock 154, adjusting the height of the shaft 14 with respect to the body 12 and replacing the spline lock 154 within a new detent groove 160.

The invention provides a simple and inexpensive method of adjusting the length of a piping conduit. Use of the length adjustable conduit of the invention allows for the inexpensive and efficient minor adjustments to the length of the conduit. The invention is especially advantageous where a sprinkler head is disposed atop the length adjustable conduit.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A length adjustable conduit comprising:
   (a) a hollow tubular body having an upper end, a lower end, an outer surface, an inner surface and a longitudinal axis;
   (b) a hollow tubular shaft having an upper end, a lower end, an outer surface, an inner surface and a longitudinal axis, the shaft being attached to the body such that the longitudinal axis of the body and the longitudinal axis of the shaft are disposed along substantially the same line, the lower end of the shaft being disposed in fluid tight communication with the upper end of the body, the body and the shaft having a combined length; and
   (c) an adjustment mechanism for adjusting the combined length of the shaft and the body while maintaining the shaft and the body in fluid tight connection, the adjustment mechanism comprising:
      (i) external threads disposed about the outer surface of the shaft;
      (ii) internal threads disposed about the inner surface of the body, the external threads on the shaft mating with the internal threads on the body so that the lower end of the shaft is threadedly attached to the body;
      (iii) an outwardly projecting lip disposed about the upper end of the body;
      (iv) a resilient sealing gasket tightly disposed about the outer surface of the shaft and disposed in contact with the outwardly projecting lip on the body; and
      (v) a retaining nut threadedly disposed to the upper end of the body, the retaining nut having a top wall with an outer side and an inner side, the inner side of the top wall being in tight contact with the resilient member to seal the resilient member to the outer surface of the shaft.

* * * * *